United States Patent [19]
Schudel et al.

[11] Patent Number: 6,040,672
[45] Date of Patent: Mar. 21, 2000

[54] ELECTROACTIVE WAVEFORM CONTROL DEVICE AND RELATED METHOD

[75] Inventors: Gregg W. Schudel, McLean, Va.; J. Scott Knight, Stonington, Conn.

[73] Assignee: GTE Internetworking Incorporated, Burlington, Mass.

[21] Appl. No.: 09/216,072

[22] Filed: Dec. 18, 1998

[51] Int. Cl.[7] ................................................. G05B 5/01
[52] U.S. Cl. ........................... 318/611; 318/623; 318/629
[58] Field of Search ................................. 318/460, 611, 318/623, 629

[56] References Cited

U.S. PATENT DOCUMENTS

| | | | |
|---|---|---|---|
| 4,626,754 | 12/1986 | Habermann et al. | 318/460 |
| 4,963,804 | 10/1990 | Geiger | 318/460 |
| 5,229,556 | 7/1993 | Geddes | 181/206 |
| 5,668,744 | 9/1997 | Varadan et al. | 364/528.15 |
| 5,720,066 | 2/1998 | Kim | 8/159 |

OTHER PUBLICATIONS

Phil Davies et al., Designing for a Mixed–Signal Motor–Control System–on–a–Chip, Computer Design, Aug. 1998, p. 79.

*Primary Examiner*—Bentsu Ro
*Attorney, Agent, or Firm*—Leonard Charles Suchyta; Floyd E. Anderson

[57] ABSTRACT

An apparatus and method for reducing vibrational noise generated by the operation of a machine. The machine includes an electric motor that is driven by a drive current generated by a power source. The vibrational noise generated by the operation of the machine induces a waveform in the drive current. An input device monitors the waveform of the drive current and quantifies the induced waveform. A signal processor translates the quantified waveform into a control waveform. A control device adds the control waveform to the drive current, thereby reducing the vibrational noise generated by the machine.

18 Claims, 7 Drawing Sheets

ELECTROACTIVE WAVEFORM CONTROL DEVICE AND RELATED METHOD

GOVERNMENT CONTRACTS

The present invention was made partly with government funds under NAVSEA Contract N00024-97-C-4071 with the Navy. The government may have certain rights in the invention.

BACKGROUND OF THE INVENTION

The present inventor relates to the field of noise and vibration reduction. More particularly, the invention relates to an apparatus and related method for actively reducing the noise and vibration produced by a machine through electroactive waveform control of the drive current.

In many cases, the operation of a machine powered by an electrical motor, such as found in a fan, creates undesirable noise. The noise generated by a fan typically includes both mechanical vibrations and aerodynamic vibrations, or sound. Mechanical vibrations can be caused, for example, when the fan is not properly balanced. The rotation of the imbalanced fan results in mechanical vibrations in the structure that supports the fan.

Aerodynamic vibrations, or sound, are typically generated when the fan blade interacts with unsteady airflow. Unsteady airflow can exist around a stator or any other fan support structure. The interaction of the fan blades with the unsteady airflow causes aerodynamic vibrations to radiate away from the fan and into the surrounding environment. These aerodynamic vibrations may either impinge on the fan structure thereby creating vibrations or continue to propagate as sound.

There are many circumstances where it is desirable to reduce or eliminate the noise generated by a fan. This is particularly apparent when the fan is used as a cooling device within an electrical device installed on board a submarine. Any structure-borne or air-borne noise generated by the fan will eventually propagate to the outer edge of the submarine where it will be radiated into the surrounding water. Obviously, any additional noise generated by the submarine increases the chances of the submarine being detected. Thus, eliminating the noise generated by the fans in the electrical devices carried on board the submarine will decrease the cumulative noise generated by the submarine, thereby decreasing the likelihood that the submarine will be detected.

In other circumstances, the noise generated by electric fans creates an annoyance or disturbance to those near the fan. For example, a noisy fan within an overhead projector can be a distraction when the overhead projector is in use. The operation of other machines, such as HVAC system components, pumps, and propellers, also generate annoying or disturbing noise.

In light of the foregoing there is a need for a device and method capable of reducing the vibrations and sound generated by a machine.

SUMMARY OF THE INVENTION

Accordingly, the present invention is directed to an apparatus and method for electroactively reducing the noise generated by a machine. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, one embodiment of the invention is directed to a noise reduction apparatus for a machine having an electric motor that is powered by a drive current from a power source. The operation of the machine causes the machine to emit vibrational noise. The vibrational noise induces a waveform in the drive current. The apparatus includes an input device that monitors and quantifies the induced waveform. A signal processor is operably connected to the input device and translates the quantified waveform into a control waveform. A control device is operably connected between the signal processor and the motor. The control device adds the control waveform to the drive current, thereby reducing the vibrational noise generated by the machine.

According to another aspect, the invention is directed to a noise reduction system. The system includes a machine having an electric motor that is driven by a drive current. The operation of the machine causes the machine to emit vibrational noise which induces a waveform in the drive current. An input device is provided for monitoring and quantifying the induced waveform. A signal processor is operably connected to the input device and translates the quantified waveform into a control waveform. A control device is operably connected between the signal processor and the motor. The control device adds the control waveform to the drive current, thereby reducing the vibrational noise generated by the machine.

In another aspect, the invention is directed to a method of noise reduction for a machine having a motor powered by a drive current from a power source. The operation of the machine causes the machine to emit vibrational noise that induces a quantifiable waveform in the drive current. The method includes the step of monitoring the waveform of the drive current of the machine. A control waveform is generated based on the monitored drive current. The control waveform is applied to the drive current to reduce the vibration signal of the drive current.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference will now be made in detail to the presently preferred embodiments of the invention, examples of which are illustrated in the accompanying drawings. Wherever possible, the same reference numbers will be used throughout the drawings to refer to the same or like parts.

In accordance with the present invention, a method and apparatus for reducing the vibrational noise generated by a machine is provided. For purposes of this disclosure, the term "vibrational noise" is intended to include both mechanical vibrations and airborne vibrations, also referred to as sound. An exemplary embodiment consistent with the present invention is illustrated in FIG. 1 and is generally designated by the reference number 20.

Figure 1:
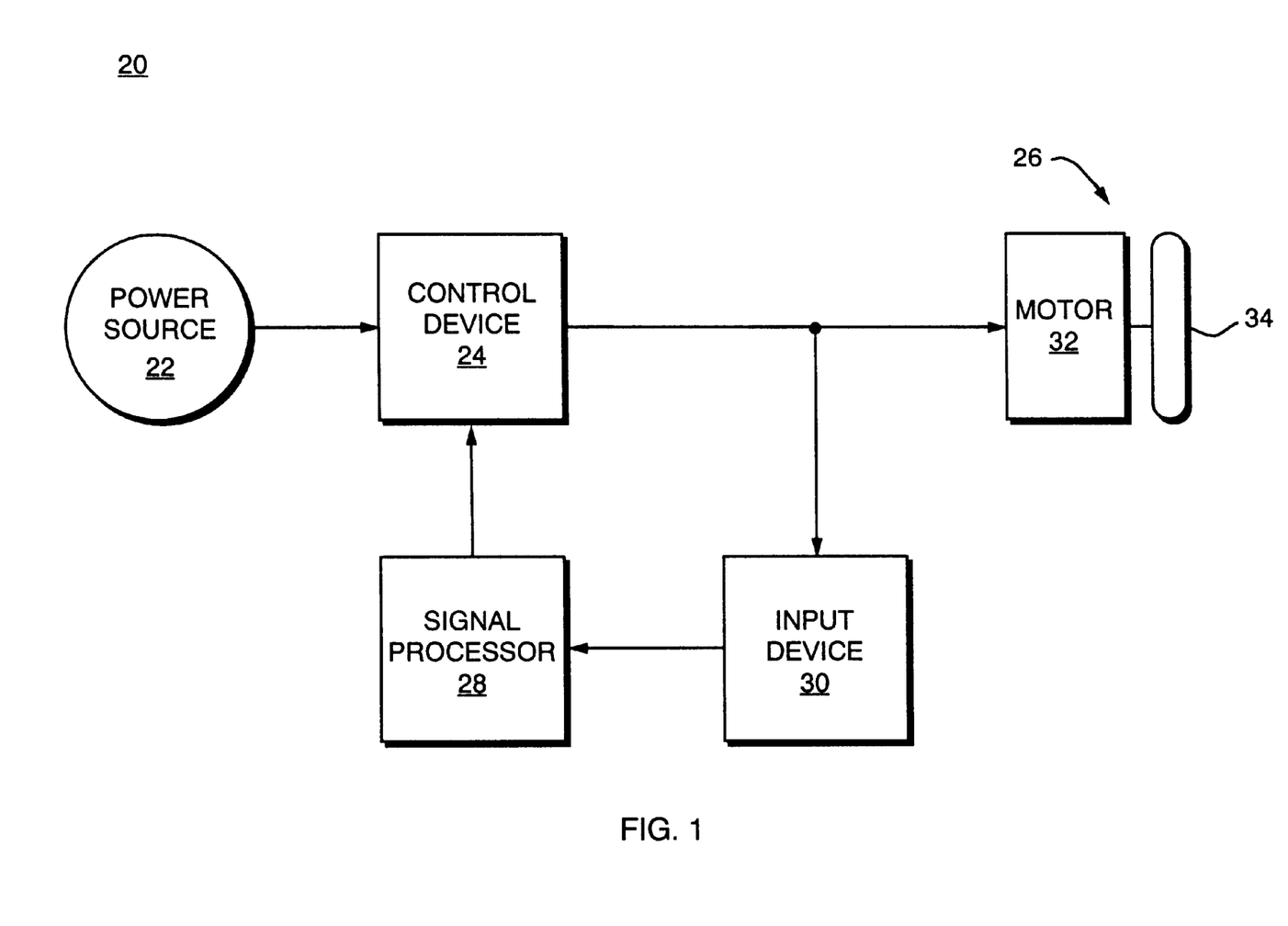
FIG. 1 is a schematic view of a preferred embodiment of a noise reduction device according to the present invention.

As illustrated in FIG. 1, a machine 26 is provided with an electric motor 32. In the exemplary embodiment, machine 26 is a fan. The present invention contemplates, however, that the apparatus and method disclosed herein may he used with any other electrically powered machine that creates vibrational noise during operation. Other exemplary machines include, but are not limited to pumps, HVAC system components, and propellers.

A power source 22 is connected to machine 26. Power source 22 generates a drive current to power motor 32 and operate machine 26. The drive current may be either direct current (DC) or alternating current (AC) depending upon the type of machine and upon the particular application. The power source may be conventional AC line current, a generator, a battery, a DC power supply or any other source of electrical power readily apparent to one skilled in the art.

It is generally known that the operation of many machines, such as the illustrative fan, results in the emission of vibrational noise from the machine. In the case of most machines, including the illustrative fan, the vibrational noise includes both a mechanical component and an aerodynamic component.

The mechanical component is typically created by structural inefficiencies of the machine. For example, in the case of the fan, the rotation of an imbalanced fan will result in mechanical vibrations within the fan support structure. The aerodynamic component of the vibrational noise is created when the fan blades interact with unsteady air flow, which could exist, for example, in the area surrounding a stator or any other structure in close proximity to the fan. The fan blades are subject to a sinusoidal force as they pass through the unsteady air flow. The discontinuity of the air flow causes the fan blades to accelerate and decelerate as the resistance exerted against the blades changes as the blades pass through the unsteady air flow. These changes in speed of the fan blades create pressure differentials which result in vibrations that radiate into the environment surrounding the fan. These vibrations produce an acoustic noise known in the art as the "blade rate tone."

It has been observed that the inefficiencies that cause the vibrational noise also induce a waveform in the drive current generated by the power source. This waveform is an electrical noise component of the drive current that results from oscillatory forces that act on the fan blade and cause variations in the torque of the motor driving the fan. The torque variations result in an AC modulation of the drive current, thereby creating the waveform in the drive current.

Figure 2:
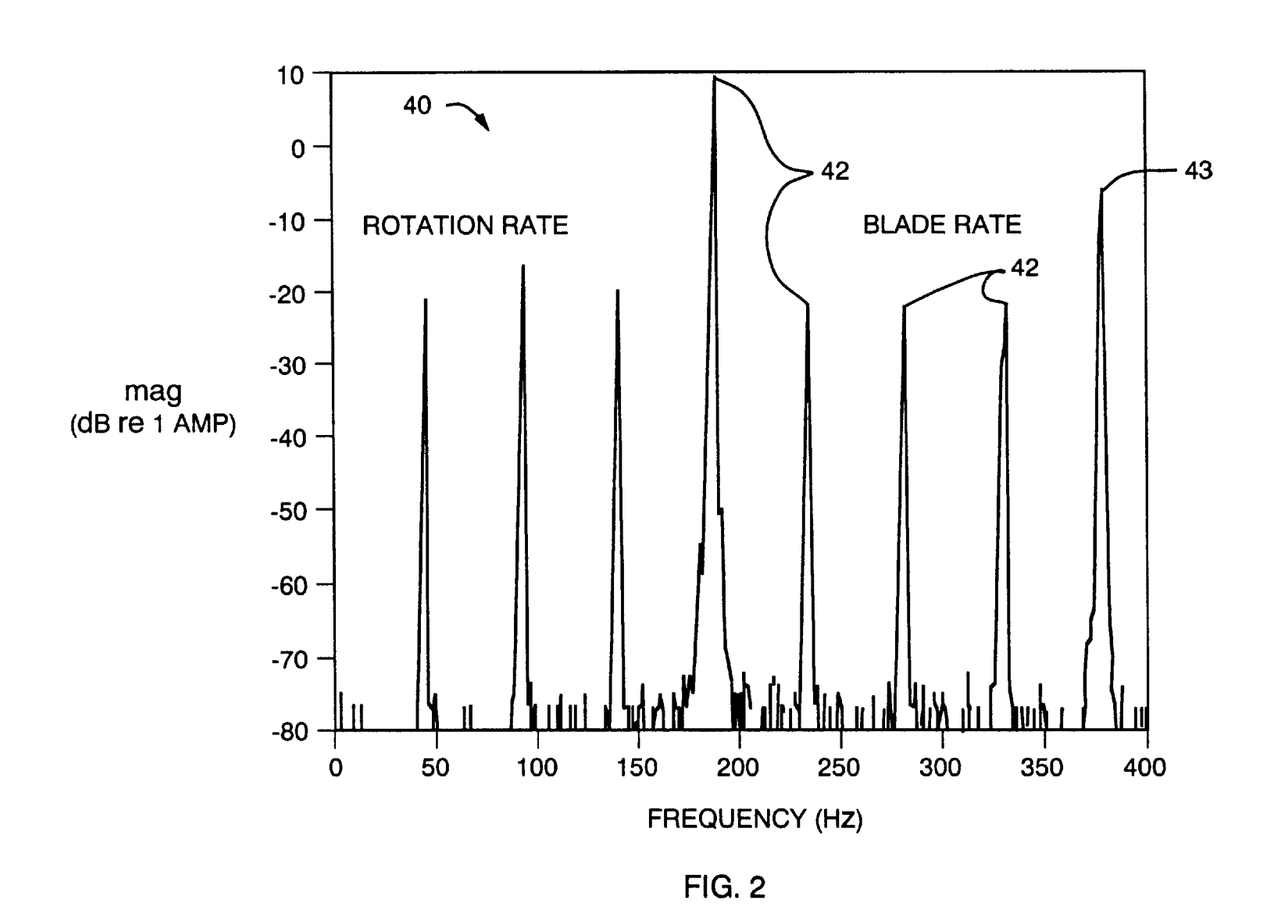
FIG. 2 is a graph of an exemplary power spectrum of the drive current for an electrically powered fan, illustrating the electrical noise component of the drive current resulting from the vibration and acoustic energy produced during the steady-state operation of the fan.

As illustrated in FIG. 2, the waveform 40 appears in the drive current of the fan. In the illustrative example, the drive current of a fan was monitored as the fan was operated at a set speed. As shown, peaks 42 appear at the fundamental frequency and the harmonic frequencies of the fan rotational rate, corresponding with the mechanical vibration and sound generated by the fan at these frequencies. The presence of peaks 42 in the drive current indicate that the vibrations experienced by the fan at the fundamental and harmonic frequencies are back-propagated to the drive current. Similarly, other vibrations or sound created during the operation of the fan, including, for example, those caused by fan blade interaction with unsteady air flow, will also appear in the drive current as shown by the presence of peak 43 in the drive current.

In accordance with the present invention, an input device is provided for monitoring the induced waveform. The input device also quantifies the induced waveform for translation into a control waveform. The present invention contemplates that the input device may monitor and quantify the induced waveform in either a "feedforward" configuration or a "feedback" configuration.

The preferred feedforward configuration is illustrated in FIG. 1. In this configuration, the input device monitors the induced waveform by monitoring the drive current itself. Preferably, input device 30 is disposed in the path of electrical current between power source 22 and machine 34 to monitor and quantify the induced waveform. The quantification of the induced waveform is used to produce a control waveform based on the characteristics of the drive current input to the machine and is therefore considered feedforward.

Preferably, in the feedforward configuration, input device 30 is a transducer that is capable of quantifying the characteristics of the drive current. However, input device 30 may be any other device readily apparent to one skilled in the art as capable of quantifying the characteristics of the drive current, for example, a transformer, current probe, or hall effect probe.

In a machine with a rotating component, such as the illustrative fan, the feedforward configuration may also include a tachometer, or like device, to monitor the rotation of the rotating component. The output from the tachometer will provide additional information on the vibrational noise being emitted by the machine.

Figure 3:
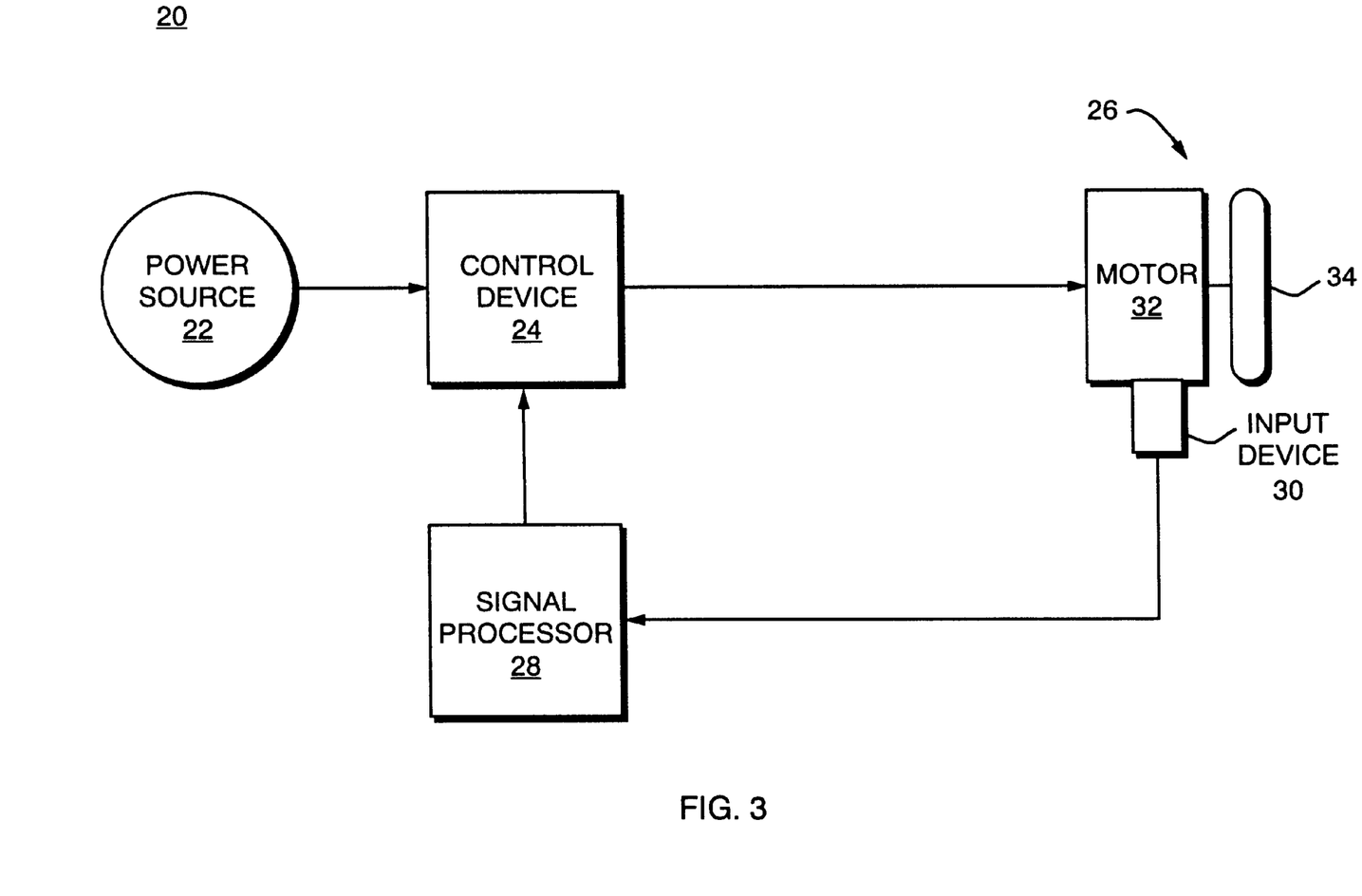
FIG. 3 is a schematic view of another preferred embodiment of the noise reduction device according to the present invention.
Figure 6:
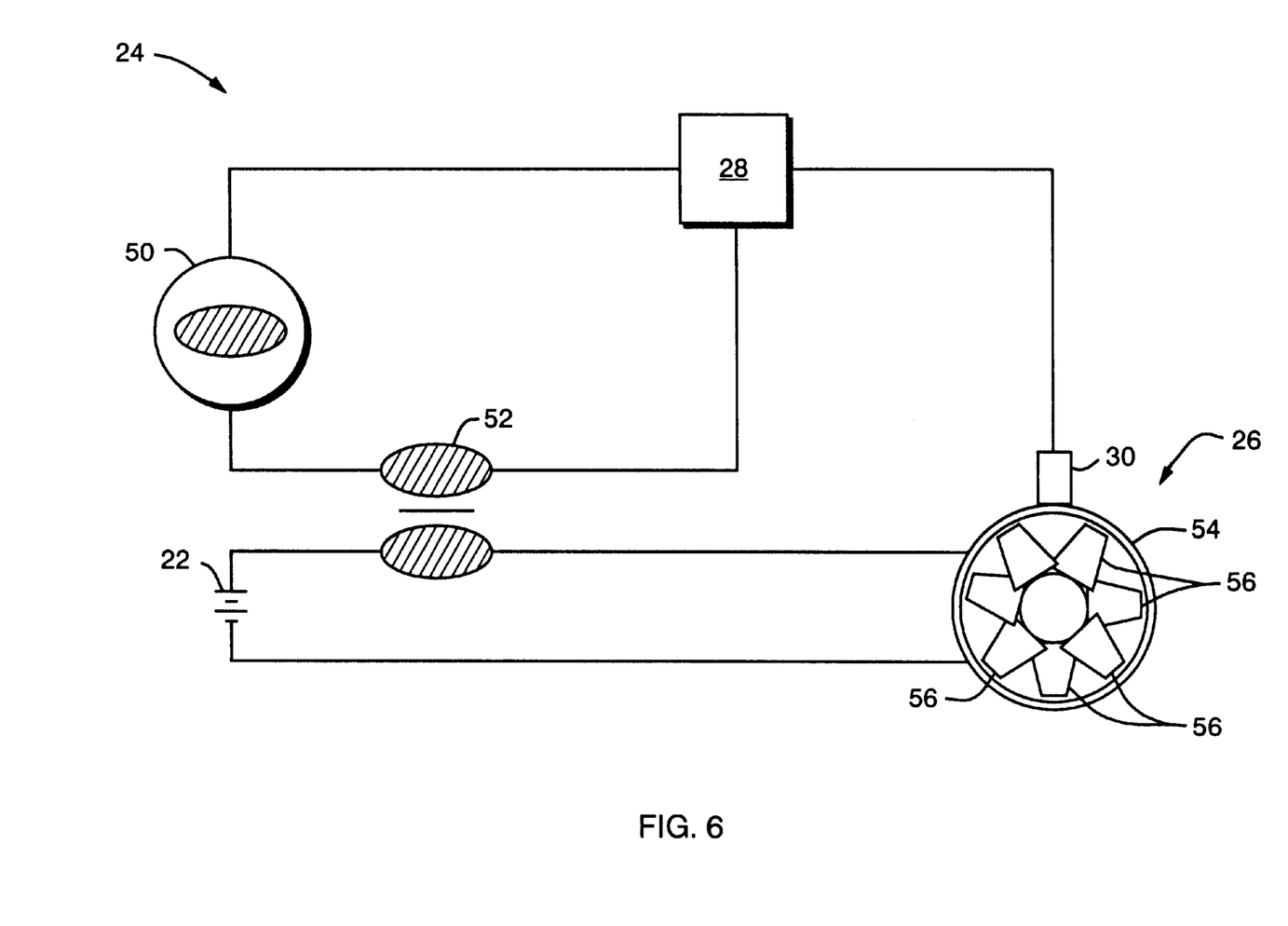
FIG. 6 is a schematic view of a noise reduction device according to the present invention, illustrating an alternative embodiment of a control device for adding a control waveform to the drive current.

An example of a feedback configuration is illustrated in FIG. 3. In this configuration, the input device monitors the induced waveform by measuring the actual mechanical vibrations and/or the sound produced during the operation of the machine. In this configuration, the input device may be a microphone or like device that is positioned proximate the machine to monitor the sound or airborne vibrations emitted by the machine. Alternatively, as illustrated in FIG. 3, input device 30 may be positioned directly on machine 26 to measure the mechanical vibrations generated by the operation of machine 26. It is contemplated that input device 30 may be affixed to motor 32 or to any other structural portion machine 26 that is readily apparent to one skilled in the art. For example, as illustrated in FIG. 6, in the case of a fan, input device 30 may be mounted on a shroud 54 surrounding fan blades 56.

In the feedback configuration, input device 30 may be a transducer, accelerometer, microphone, geophone or another similar device recognized by one skilled in the art as being capable of measuring the mechanical vibrations or sound generated by the machine.

In accordance with the present invention, a signal processor is connected to the device monitoring the drive current. The signal processor translates the quantified waveform into a control waveform based on the characteristics of induced waveform. The control waveform is produced as an actuation modulation current at each frequency (and at harmonics of that frequency, if desired) that, when added to the drive current, will counter the induced waveform in the drive current. It is contemplated that the signal processor may be digital or analog and that a number of possible devices will be readily apparent to one skilled in the art.

Figure 4:
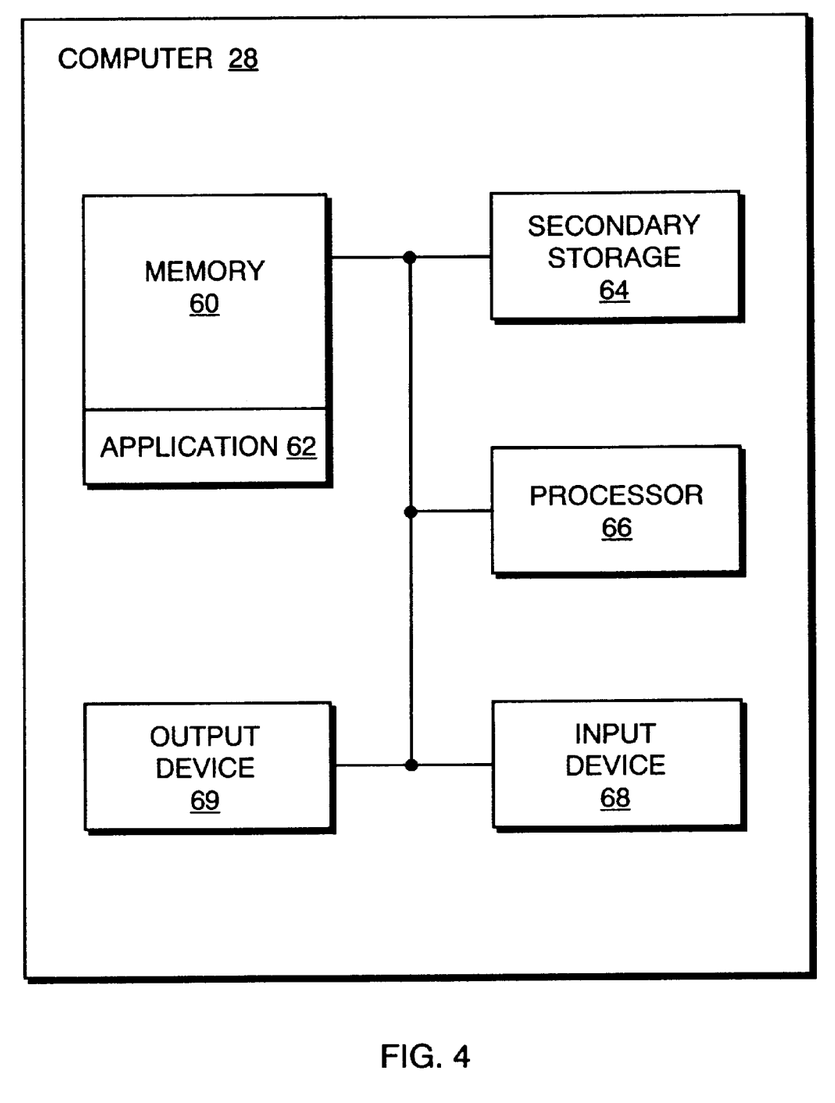
FIG. 4 is a diagram of a signal processor for receiving the quantified characteristics of the monitored waveform and translating the characteristics into a control waveform.

FIG. 4 depicts in more detail an exemplary signal processor 28 that is suitable for translating the quantified waveform into a control waveform. Signal processor 28 includes a memory 60, a secondary storage device 64, a processor 66, such as a central processing unit, an input device 68, and an output device 69. Memory 60 and secondary storage 64 may store applications, such as application 62, or information for execution and use by processor 66. Although signal processor 28 is depicted with various components, one skilled in the art will appreciate that this signal processor can contain additional or different components.

Signal processor 28 translates the quantified waveform into a control waveform. Signal processor 28 uses a control algorithm to translate the characteristics of the induced waveform as quantified by input device 30 into the control waveform. Many control algorithms capable of translating the quantified waveform into the control waveform are well known in the art. It is contemplated than the use of any such algorithm is within the scope of the present invention. Preferably, the control algorithm synchronously generates the control waveform.

In accordance with the present invention, a control device is operably connected between the signal processor and the motor of the machine. The control device adds the control waveform generated by the signal processor to the drive current of the machine. In this manner, the vibrational noise generated by the machine may be electroactively reduced.

Figure 5:
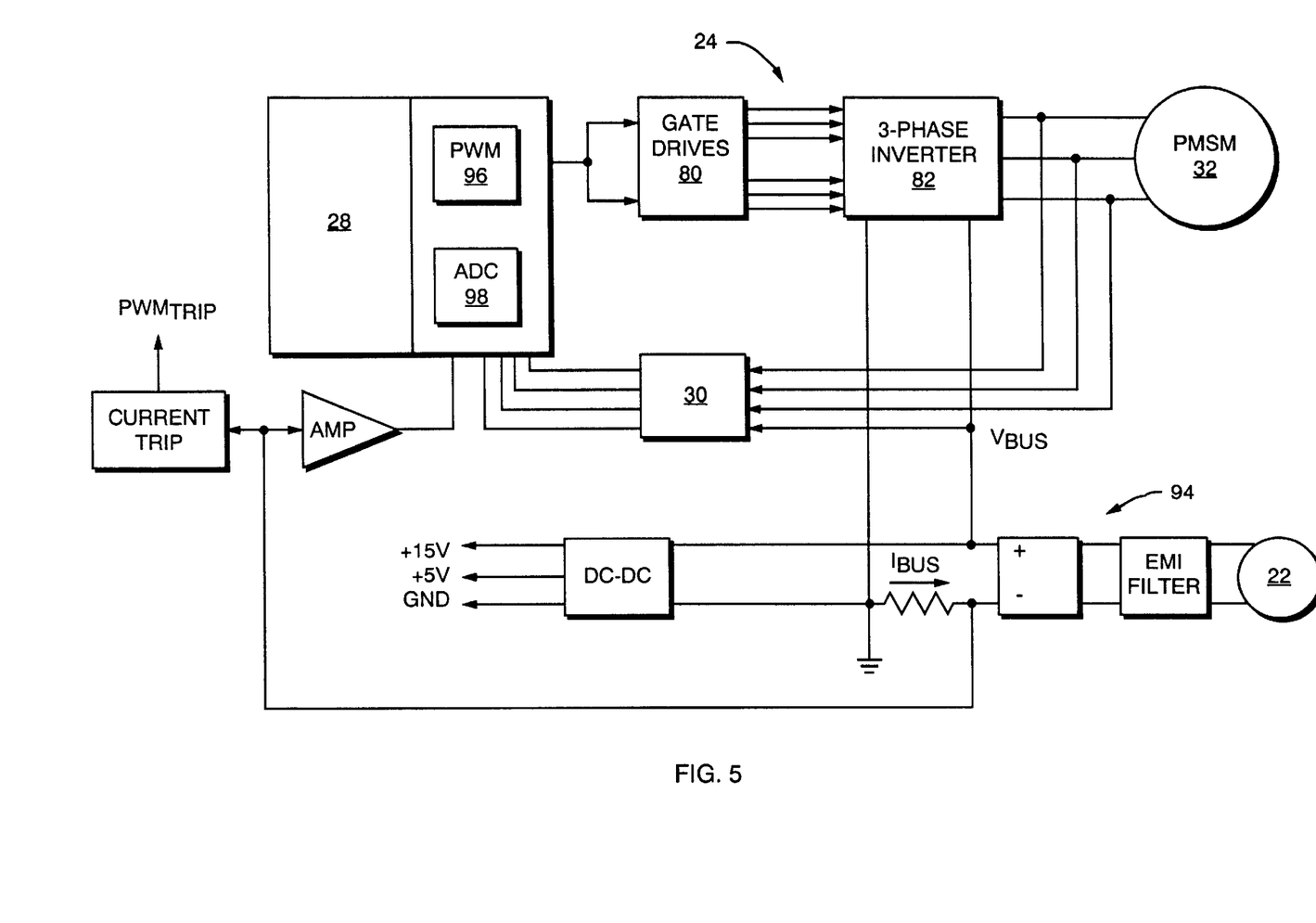
FIG. 5 is a schematic diagram of a control device for applying the control waveform to the drive current in accordance with the present invention.

In one preferred embodiment and as illustrated in FIG. 5, control device 24 is a three-phase motor control. An exemplary control system suitable for use in the present invention is disclosed in Phil Davies, Designing for a Mixed-Signal Motor-Control System-On-A-Chip, Computer Design, August 1998, at 79, the disclosure of which is hereby incorporated by reference in its entirety. The three phase motor control is electrically connected between AC power source 22 and motor 32. An input rectifier 94 converts the input AC line voltage to a DC voltage. A three-phase power inverter 82 converts the DC voltage to three-phase AC voltage to drive motor 32.

A set of gate drives 80 are connected to three-phase inverter 82. Gate drives 80 control the on off cycles of the switches within three-phase inverter 82. Varying the on off cycles of three phase inverter 82 varies the voltage, and thus the current, applied to motor 32.

A feedback loop that includes an analog to digital converter 98 is included to capture and translate feedback signals from the drive current for signal processor 28. As described previously, based on the input from input device 30, signal processor 28 calculates the current that should applied to motor 32 as a function of time. Signal processor 28 controls a pulse width modulation (PWM) circuit 96 which governs the on and off cycles of gate drives 80 to vary the AC voltage generated by three phase inverter 82 to drive motor 32. In this manner, the voltage, and drive current, supplied to motor 32 may be electroactively adjusted to include the control waveform.

In an alternative embodiment and as illustrated in FIG. 6, control device 24 includes a transducer 52 powered by an AC power source 50. Transducer 52 is disposed in the path of electrical current between DC power source 22 and machine 26. Signal processor 28 modulates AC power source 50 to vary the voltage applied to transducer 52. Varying the voltage applied to transducer 52 alters the waveform of the DC drive current. Thus, appropriate control of AC power source by signal processor 28 will impart the cancellation signal into the drive current of machine 26.

The operation of the aforementioned device will now be described with reference to the attached drawings. As illustrated in FIG. 1, power source 22 provides a drive current to a cooling fan 26. As previously described, the operation of fan 26 results in the generation of vibrational noise, which induces a quantifiable waveform in the drive current.

Figure 7:
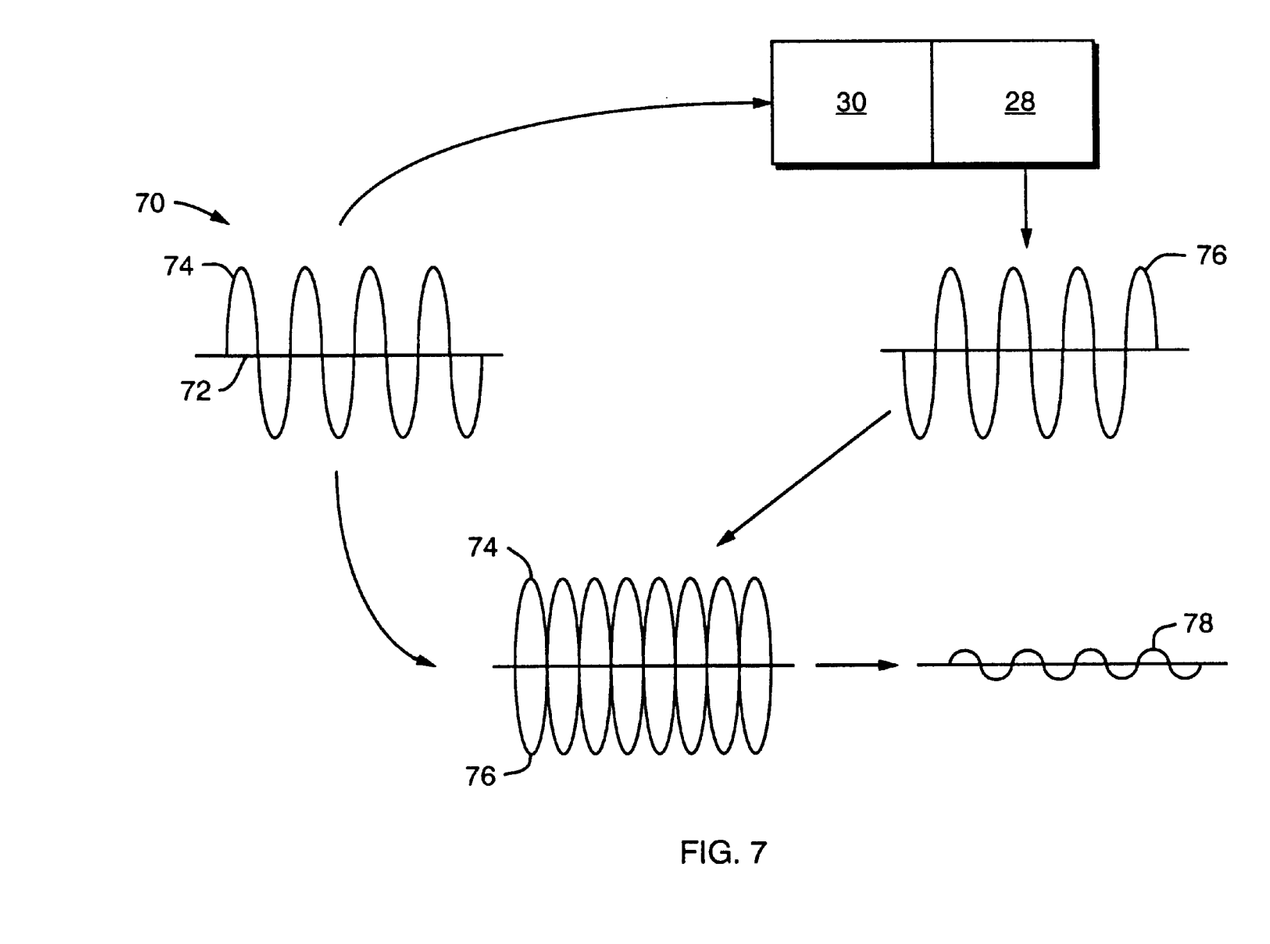
FIG. 7 is a diagram illustrating the generation of a control waveform and the application of the control waveform to the drive current to reduce the vibrational noise generated by the machine.

The drive current is monitored by input device 30. As illustrated in FIG. 7, drive current 70 includes a DC component 72 and an induced waveform 74. DC component 72 results from the DC power source and induced waveform 74 is induced by the vibrational noise emitted during operation of fan 26.

The drive current 70 is monitored by input device 30 which quantifies the waveform of the drive current. Alternatively, the induced waveform may be monitored and quantified by measuring the mechanical vibrations and/or sound generated during the operation of the machine. The quantified waveform is sent to signal processor 28. Signal processor 28, as described above, translates the quantified waveform into a control waveform 76. Control waveform 76 is adjusted to have a preferential magnitude and phase with the induced waveform 74 of drive current 70.

The control waveform 76 is applied to drive current 70 by control device 24. The combination of the control waveform 76 and drive current 70 acts to cancel or reduce the induced waveform 74 of the drive current. Thus, the resulting drive current 78 applied to fan 26 has an AC component with a greatly reduced magnitude.

The modified drive current results in a modification of the torque produced by the motor driving the fan. The torque modifications are timed to coincide with portion of the fan rotation where the vibrations occur. This will prevent the generation of vibrations, for example, when the fan blade is passing through unsteady air flow near a stator. As the fan blade passes through the an unsteady area, the fan blades accelerates and decelerates, thereby creating pressure differentials. The drive current of the motor is adjusted to compensate for these accelerations and decelerations by increasing or decreasing the torque of the motor to prevent any change in speed. Thus, the fan blades will not accelerate and decelerate through the unsteady air and will not create the pressure differentials that result in the noise known as the blade rate tone of the fan. Adjusting the torque in this manner may also prevent the creation of other types of vibrational noise in addition to the blade rate tone.

It will be apparent to those skilled in the art that various modifications and variations can be made in the construction of this noise reduction apparatus and in the noise reduction method without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A machine having a noise reduction apparatus and having an electric motor powered by a drive current from a power source, wherein operation of the machine causes the machine to emit vibrational noise, the vibrational noise inducing a waveform in the drive current, the apparatus comprising:

an input device for measuring the vibrational noise and for quantifying the induced waveform;

a signal processor operably coupled to the input device and for producing a control signal as a function of the quantified induced waveform; and a control device coupled between the signal processor and the electric motor, the control device being operable to add the control signal to the drive current, to reduce the vibrational noise generated by the machine.

2. The noise reduction apparatus of claim 1, wherein the vibrational noise includes mechanical vibrations and the input device measures the mechanical vibrations emitted by the machine.

3. The noise reduction apparatus of claim 1, wherein the vibrational noise includes sound and the input device measures the sound emitted by the machine.

4. The noise reduction apparatus of claim 1, wherein the input device measures the waveform induced in the drive current.

5. The noise reduction apparatus of claim 4, wherein the input device is a transformer.

6. The noise reduction apparatus of claim 1, wherein the machine includes a rotating component and the input device measures the rotation of the rotating component.

7. The noise reduction apparatus of claim 1, wherein the machine is a fan.

8. The noise reduction apparatus of claim 1, wherein the control device is an electrical motor controller.

9. A noise reduction system, comprising:

a machine having an electric motor being driven by a drive current, wherein operation of the machine causes the machine to emit vibrational noise, the vibrational noise inducing a waveform in the drive current;

an input device monitoring the vibrational noise and quantifying the waveform induced in the drive current;

a signal processor coupled to the input device for translating the quantified induced waveform into a control signal; and a control device coupled between the signal processor and the electricmotor, the control device adding the control signal to the drive current, to reduce the vibrational noise generated by the machine.

10. The system of claim 9, wherein the input device is a transformer.

11. The system of claim 9, wherein the control device is an electrical motor controller.

12. The system of claim 9, wherein the drive current is direct current.

13. The system of claim 9, wherein the drive current is alternating current.

14. A method of noise reduction for a machine having an electric motor powered by a drive current from a power source, wherein operation of the machine causes the machine to emit vibrational noise, the vibrational noise inducing a waveform onto the drive current, the method comprising the steps of:

measuring the vibrational noise generated by the mechanical vibration of the machine and quantifying the induced waveform;

generating a control signal based on the quantified induced waveform; and applying the control signal to the drive current to reduce the induced waveform on the drive current.

15. The method of claim 14, wherein the induced waveform of the vibrational noise is measured in the drive current of the machine.

16. The method of claim 14, wherein the vibrational noise includes mechanical vibrations and an input device measures the mechanical vibrations emitted by the machine.

17. The method of claim 14, wherein the vibrational noise includes sound and the sound is measured by an input device positioned proximate to the machine.

18. The method of claim 14, wherein the control signal is synchronously generated based on the measured waveform.

\* \* \* \* \*